United States Patent [19]

Margarit-Metaxa et al.

[11] Patent Number: 4,794,790

[45] Date of Patent: Jan. 3, 1989

[54] DIAGNOSTIC METHOD AND ARRANGEMENT FOR QUANTITATIVELY CHECKING ACTUATORS IN INTERNAL COMBUSTION ENGINES

[75] Inventors: Florin Margarit-Metaxa, Hamburg; Helmut Denz, Stuttgart, both of Fed. Rep. of Germany

[73] Assignee: Robert Bosch GmbH, Stuttgart, Fed. Rep. of Germany

[21] Appl. No.: 74,897

[22] Filed: Jul. 17, 1987

[30] Foreign Application Priority Data

Jul. 19, 1986 [DE] Fed. Rep. of Germany ....... 3624441

[51] Int. Cl.$^4$ ............................................. G01M 19/00
[52] U.S. Cl. .................................... 73/117.3; 73/118.1
[58] Field of Search ................ 73/117.3, 117.2, 118.1, 73/168, 119 R; 364/551

[56] References Cited

U.S. PATENT DOCUMENTS 4,402,217 9/1983 Higashiyama .................... 73/117.3

Primary Examiner—Stewart J. Levy
Assistant Examiner—Robert R. Raevis
Attorney, Agent, or Firm—Walter Ottesen

[57] ABSTRACT

A diagnostic method and arrangement quantitatively checks actuators during the open-loop and/or closed-loop control of operational parameters of an internal combustion engine. The method and arrangement checks the idle actuator and the tank venting value well as the associated hardward chains, that increased or decreased quantities of air ($\pm \Delta Q_{TEV/LLR}$) be supplied via an appropriate controlling to the tank-venting valve or of the idle regulator, preferbly simultaneously and in opposite directions and that the resulting possible changes of rotational speed (rotational speed remains constant; rotational speed decreases; rotational speed increases) be determined and appropriately evaluated.

3 Claims, 3 Drawing Sheets ary of the invention
DIAGNOSTIC METHOD AND ARRANGEMENT FOR QUANTITATIVELY CHECKING ACTUATORS IN INTERNAL COMBUSTION ENGINES

FIELD OF THE INVENTION

The invention relates to a diagnostic method and arrangement for quantitatively checking actuators in the open-loop and/or closed loop control of operating parameters of an internal combustion engine The actuators include the idle actuator, tank-venting valve and the like.

BACKGROUND OF THE INVENTION

It is known in the operation of internal combustion engines to determine the idle mode of operation of a motor vehicle by a separate actuator (LLS). Values result in idle which differ considerably from the usual operating parameters, which values make it logical to control the idle directly by evaluating the idle actual value rotational speed by providing a so-called idle actuator (LLS) which determines and sets the air quantity to be supplied in bypass to the internal combustion engine for this operating state. More specifically, the idle actuator is installed in a bypass of the choke flap and allows the air flow to be controlled in a classic split-range mode, as idle and normal loads differ considerably. Such an idle actuator can be designed, for example, as a two-winding rotary actuator which adjusts an air-bypass flap by appropriately energizing its windings.

It is also known in the operation of internal combustion engines that gasoline vapors escaping from the tank can be caught, primarily for reasons of environmental protection, usually by means of an activated carbon filter. In addition, the activated carbon filter can be cleaned via an associated tank-venting valve into the intake area of the internal combustion engine by means of an appropriately timed control. As a consequence of this cleaning operation, additional fuel is supplied to the engine which was not taken into consideration in the computation of the particular fuel quantity to be supplied. Also, an excess amount of air which was not taken into consideration is supplied. It is therefore also necessary to introduce a so-called mixture adaptation stop during tank venting phases. This is done to prevent in the highly developed fuel-metering measuring systems of today, which partially learn from actual value behavior feedback, erroneous adaptations and falsifications from occurring in the characteristic fields of the adaptive learning systems as a result of the tank venting quantities which can not be detected. More specifically, it is therefore necessary to stop the so-called mixture adaptation during tank venting phases to avoid potential erroneous values being written into the characteristic fields (memory matrices) of the adaptive systems as a result of this additional non-detectable amount of fuel which acts further as an undesirable offset factor.

SUMMARY OF THE INVENTION

There is a need for the quantitative checking of mechanical, usually electromechanical actuators associated primarily with these two areas of idle control and tank venting of an internal combustion engine. Accordingly, it is an object of the invention to provide an appropriate diagnostic method which makes it possible to check such actuators during operation by means of obtaining an actually occurring, that is, physical feedback which actively responds only in a malfunction condition.

The invention affords the advantage that the diagnosis can be utilized at any time, even outside of the repair shop, for example, by periodically calling a program function included in the control software of the internal combustion engine upon occurrence of defined operating behavior (that is, idle mode of operation for a predetermined time period); on the other hand, appropriate test cycles can be run through without difficulty in repair shops by calling the desired program sequence in an appropriate external manner.

It is also possible to manipulate the particular hardware components to be checked from the outside. That is, it is possible to manipulate the idle regulator or the tank-venting valve thereby bringing these two component parts into a particular end or intermediate position not provided for in this operating state and to observe the performance of the rotational speed of the internal combustion engine.

The invention is based on the recognition that there is a relationship between the area of idle control and of tank venting which can be utilized in the sense of a quantitative diagnostic method to check both areas for a smooth functioning of their actuators.

Since the essential advantage is realized that the feedback evaluated for the diagnosis is not a series of electric signals, the invention makes it possible to check the entire hardware chain of the particular area (idle, tank venting).

A particular advantage results that for a satisfactory condition of both areas the driving performance or the operating condition remain unaffected, so that the diagnostic method can be passively performed and an active response is only detectable for a defective condition.

It is especially advantageous that the connection of idle function and tank venting can be carried out in different ways, so that if the signals are not clear enough in a certain test cycle, other test cycles can be carried out on the same basis. This basis always provides that an increased or decreased quantity of air is supplied via the tank-venting valve or via the idle actuator. The smooth functioning of both subsidiary areas can also be recognized by an oppositely directed change in the quantity of air or of the rotational speed, depending on whether other control components used for a smooth operation of an internal combustion engine under the various conditions are admitted in the diagnosis or not, that is, especially the so-called $\lambda$-control.

BRIEF DESCRIPTION OF THE DRAWINGS

The invention will now be explained with reference to the drawings, wherein.

DESCRIPTION OF THE PREFERRED EMBODIMENTS OF THE INVENTION

Figure 1:
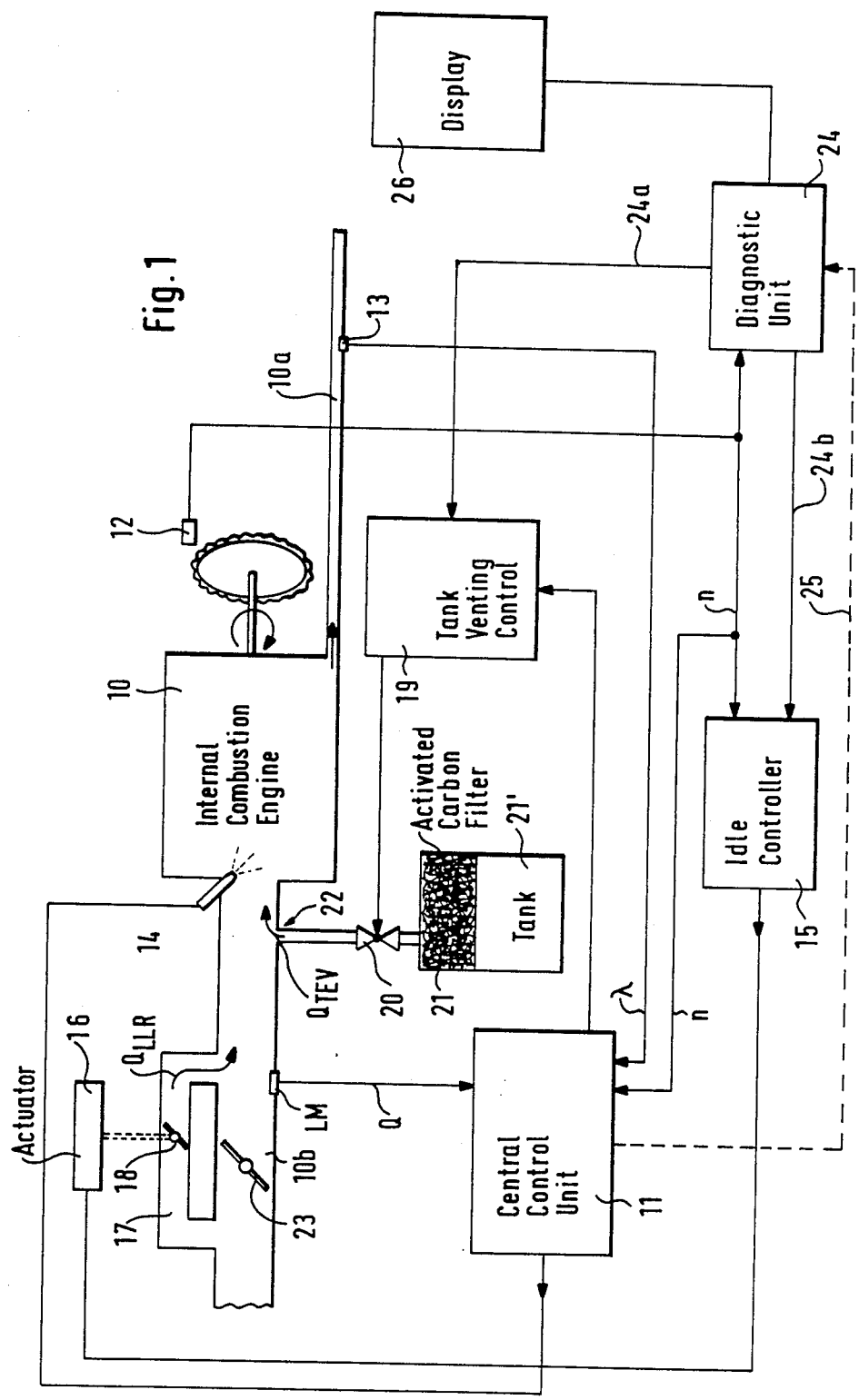
FIG. 1 is a schematic of an arrangement according to the invention which includes electronic, electric and electromechanical open-loop and closed-loop control elements as well as actuators for the operation of an internal combustion engine with the areas of idle control and tank venting being especially indicated.

The basic concept of the invention includes performing an actuator self-diagnosis for the areas of idle control and tank venting during the operation of a motor vehicle while the engine is running. In this self-diagnosis, a genuine physical feedback reaction results which, however, is signaled to the outside only in a defective state and which is based on the fact that increased or decreased additional amounts of air are intentionally supplied via the bypass of the idle control or the tank venting. The resulting internal combustion engine reaction is then compared with a table, which allows corresponding satisfactory or faulty states to be identified. This table and its inquiry can of course also be a program part, that is, it can be deposited in the form of stored values in the area of a central microcomputer for comparison purposes.

In the illustrative embodiment of the invention shown in the drawing, it is understood that the individual components and blocks can be designed in analog, digital or even hybrid technology or can comprise, entirely or partially combined, appropriate areas of program-controlled digital systems, that is, microcomputers, microprocessors, digital or analog logic circuits, et cetera.

In the drawing, the internal combustion engine is designated by reference numeral 10, its exhaust pipe by 10a and the intake pipe or the intake area by 10b. The other components which assure the operation of the internal combustion engine are only discussed to the extent necessary for an understanding of the invention and for the basic relationships.

Central control unit 11 is usually a microcomputer with microprocessor, associated memory, current supply and peripheral sensors as well as actuators. This central control unit 11 receives operating state data about the load Q of the internal combustion engine 10 from air-flow sensor LM which is located in intake pipe 10b and can be an air-flow sensor plate, pressure sensor, hot-wire sensor or the like; further, the control unit 11 receives data about the rotational speed n from rotational speed sensor 12, which inductively detects the teeth of a gear rotationally driven by the engine. As a still further basic quantity, the central control unit 11 receives the output signal of lambda-probe 13 which measures the oxygen content and is located in the exhaust pipe. And, if one considers the engine 10 as part of the regulating loop, the central control unit 11 receives the actual value with respect to the particular operating state of the engine, more precisely, about the oxygen content in the exhaust.

From this data and from other peripheral data supplied, such as engine and air intake temperature, air pressure, et cetera, the microcomputer generates an output signal computed with great precision. In the case of a fuel injection system, for example, this output signal can be an injection control command ti for controlling injection valves which are symbolically indicated at 14 in the air intake area of the engine 10.

Switching blocks or control units can be separately provided for the operation of the engine in idle, namely, idle controller 15, which computes the control error between the actual-value rotational speed (n) of the engine and its predetermined desired value and acts on an actuator 16 in order to compensate for this error. The actuator 16 can be, for example, a two-winding rotary actuator which adjusts an idle air flap 18 in a bypass passage 17 in a corresponding manner.

Finally, another separate control unit 19 is provided for controlling the tank-venting valve 20; however, the control unit 19 can also form a part of the central microcomputer. Tank-venting valve 20 connects the outlet of activated carbon filter 21 to the intake area of engine 10, the junction into the intake pipe being at 22 and behind air-flow sensor LM. The activated carbon filter 21 is associated with fuel tank 21'.

In view of the above, the air quantity which is supplied to an internal combustion engine at idle with the choke flap 23 closed comprises two main components, namely:

(a) the air quantity which is supplied via the idle actuator and therefore as a function of the active idle control and which is designated in the following as $Q_{LLR}$; and, (b) the air quantity which is supplied via the tank-venting valve (which can be intermittently actuated) and which, in contrast to the air quantity of (a) reaching the engine via the idle actuator bypass valve, is not detected by air-flow sensor LM. This tank venting air quantity is designated in the following as $Q_{TEV}$.

For the sake of simplicity, it is assumed that the component air quantities according to (a) and (b) have the same density, which is readily permissable because of the low level of influence. Any differences, caused by pressure and/or temperature differences, the state of activated carbon filter 21 of the tank venting and the like can be disregarded. However, a prerequisite with respect to the state of the activated carbon filter is that it is cleaned to a great extent, that is, that practically no additional fuel quantity results when an additional quantity of air is supplied via tank-venting valve 20.

Other prerequisites for the diagnosis, which can be readily maintained and taken into consideration as peripheral conditions, are that: the fuel quantity supplied during the diagnosis is maintained constant, which in an injection system means that injection time $t_i$ is maintained constant before the diagnosis and remains constant during the diagnosis; and, that: $\lambda = 1$.

A first variant of the diagnostic method of the invention is as delineated below under the prerequisites presented in the foregoing:

Tank venting valve 20 is opened (for example, by increasing the control pulse-duty factor applied to the valve 20 from the tank-venting control) so that the air quantity supplied for tank ventilation is $$Q_{TEV} \rightarrow Q_{TEV} + \Delta Q_{TEV\ Diagn}$$

and, (2) The idle actuator is closed, (for example, by reducing the pulse-duty factor of the control pulse train supplied to the idle actuator) at the same time, so that the air quantity supplied to the engine and originating from the idle area is given by:

$$Q_{LLR} \rightarrow Q_{LLR} \Delta Q_{LLR\ Diagn}.$$

In this formula, $\Delta Q$ is a specific constant of the engine which is determined in the application and can be, for example, of the following magnitude: $\Delta Q = 1.5\ m^3/h$.

Since $\Delta Q_{TEV}$ is essentially equal to $\Delta Q_{LLR}$, that is $\Delta Q_{TEV} \approx \Delta Q_{LLR}$, the total air quantity remains constant since the $\Delta Q$ value is added in a supplementary manner at (1) while it is simultaneously taken away at (2).

The rotational speed of the engine is now observed and three different diagnostic states of the rotational speed can result as the following listing shows, namely:

I. $n_{Diagn} = n_{alt} \pm \Delta n_{Tol}$

It follows from this that both actuators are in order.

II. $n_{Diagn} > n_{alt} + \Delta n_{Tol}$

It follows from this that the idle actuator is defective.

III. $n_{Diagn} < n_{alt} - \Delta n_{Tol}$

It follows from this that the tank-venting valve is defective.

The parameters in the foregoing are given below:

$n_{Diagn}$ is the diagnosed rotational speed of the engine.

$n_{alt}$ is the engine rotational speed prior to starting the diagnosis.

$\Delta n_{Tol}$ is tolerance of rotational speed deviation (engine constant value, to be ascertained during application).

Such a diagnostic result according to I, II, and III is readily understandable because when the total quantity of air supplied remains constant, the rotational speed of the engine will also not change; on the other hand, the actuators in both areas, idle control and tank venting, must be in order, since it would otherwise not be possible to realize precisely such a reduced quantity of air with respect to one actuator as can be compensated for with respect to the other actuator by an additional supply of air. Thus, the actuators in both areas of idle control and tank venting must function correctly as, otherwise, the air flow will be unbalanced and differ from the previous air flow.

If the rotational speed becomes greater according to II, then the reason must be that the idle actuator is defective because the additional air supplied via the intact tank-venting valve and the corresponding associated hardware chain could not be reduced to a corresponding extent by the defective idle actuator. A greater quantity of air means a higher rotational speed.

Correspondingly, this means in the case of diagnostic result III, in which the idle rotational speed decreases, that the air quantity has decreased. The air flow decrease via the idle actuator was not correspondingly compensated by the tank-venting valve, proving its defective state.

It is evident: that the driving performance in the satisfactory state is not changed by the oppositely directed control of the air flow in the areas of idle and tank venting; that the rotational speed remains constant; and, that the entire diagnosis is performed in a passive manner. Accordingly, such a test cycle can also be added into a normal LL operation outside of the repair shop in a suitable manner. This results in the possibility of also checking the idle actuator for tank venting and idle control during travel and outside of the repair shop without any influencing occurring.

Figure 2:
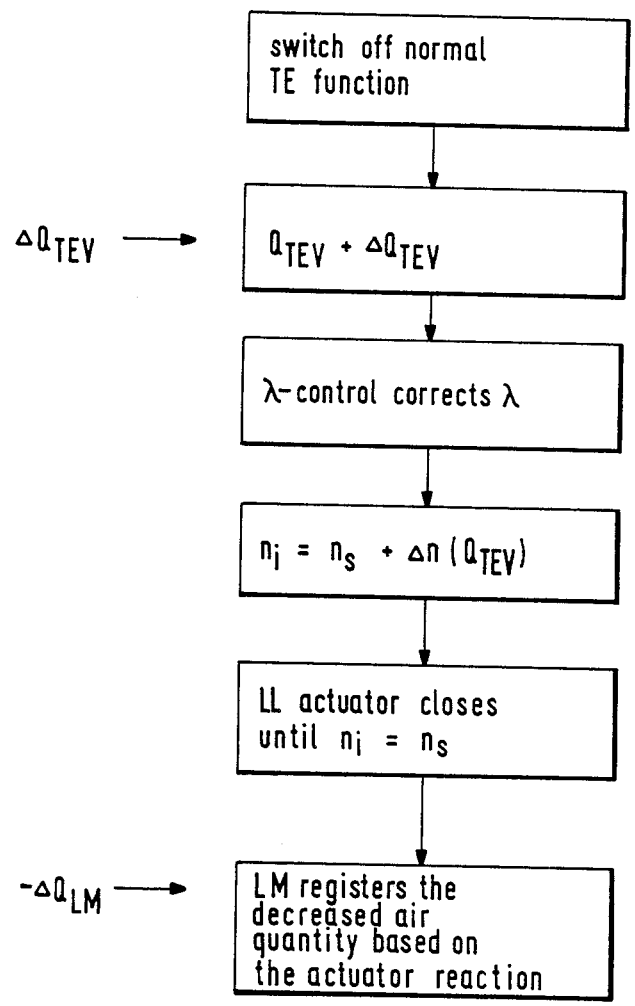
FIG. 2 is a flow chart showing a diagnostic variant for determining a trouble-free operation or malfunction in the actuator area of idle control and tank venting; and, FIG. 3 is a flow chart showing a further diagnostic variant based on a before-and-after comparison of the rotational speed.

Another diagnostic variant for determining a trouble-free operation or malfunction in the actuator area of idle control and tank venting is indicated in the small flow chart shown in FIG. 2. In this instance, only the quantity of air passing via the tank venting to the engine is increased for diagnostic purposes.

The test cycle of the flow chart of FIG. 2 is based on the inclusion of other control mechanism (i-control) which are active in the metering of the quantity of fuel to be supplied to the engine.

It is possible, by switching off the normal tank venting operation (valve open) to supply an additional quantity of tank venting air $\Delta Q_{TE}$, which is not measured by the air-flow sensor LM and can therefor not be included in the calculation of the fuel quantity. Therefore, a λ-correction occurs via the λ-control (the λ-probe measures a higher oxygen concentration) which increases the quantity of fuel injected (additional charge) and subsequently, the idle rotational speed.

On the other hand, the independent idle control registers this increase of the idle rotational speed caused by the λ-control and attempts to reduce this speed by decreasing the quantity of air supplied via the idle actuator-bypass flap until the rotational speed is again essentially equal to the predetermined idle rotational speed.

The usual air-flow sensor is, however, as was mentioned above, designed in such a manner that it measures air quantities supplied via the idle control, so that a proper operation of both hardware groups can be observed when a reduced quantity $(-\Delta Q_{LM})$ appears on the air-flow sensor which quantity then approximately corresponds to the additional tank venting increased quantity $\Delta Q_{TEV}$, at least for the steady-state condition of the λ-control. Stated otherwise, balanced air flow deviation $\Delta Q_{LM} = \Delta Q_{TEV}$ (for a steady-state operation of the λ-control) defines the proper operation of both hardware chains. Stated otherwise, balanced air flow deviation $\Delta Q_{LM} = \Delta Q_{TEV}$ (for a steady-state operation of the λ-control) defines the proper operation of both hardware chains.

Figure 3:
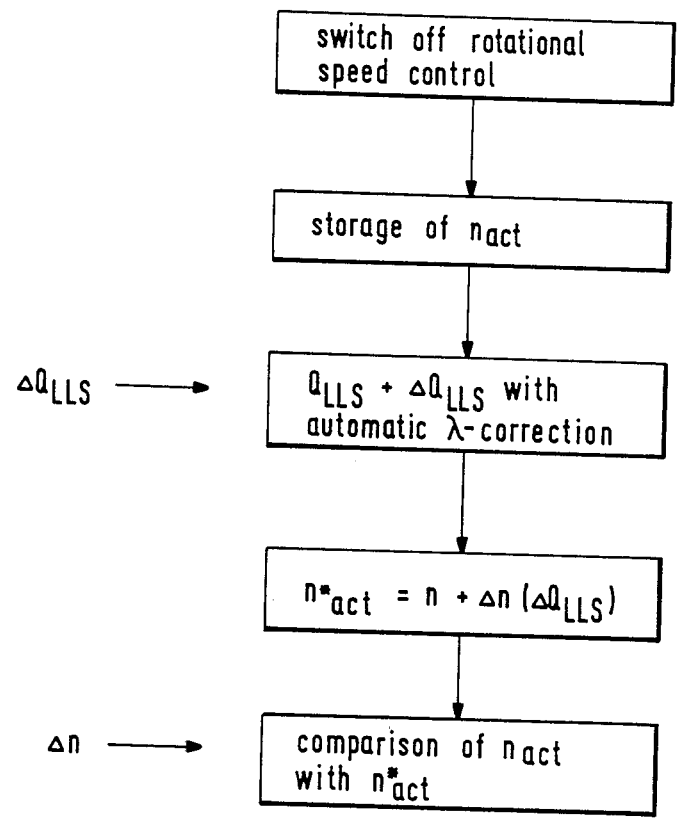

A third variant, which is again based on a before-and-after comparison of the rotational speed, is shown in the flow chart of FIG. 3 and can also be best performed as a repair shop test for the idle actuator. This third variant provides that an additional quantity of air is supplied in idle $(Q_{LLS} + \Delta Q_{LLS})$ and the behavior of the rotational speed is observed.

In this diagnostic procedure, the idle rotational speed control should be first switched off so that it does not automatically act when the rotational speed changes.

Then, the idle rotational speed is determined and stored. Thereafter, an additional air quantity $\Delta Q_{LLS}$ is supplied by an appropriate actuation of the idle actuator (increasing the pulse-duty factor). The λ-correction occurs here automatically because of the data supplied to the particular computing units, since this additional air quantity $\Delta Q_{LLS}$ is measured by the air-flow sensor LM and a corresponding quantity of fuel is supplied. This increases the rotational speed and the rotational speed difference can be determined when the idle-speed control is switched off.

Expressed in terms of hardware, the invention thus comprises a separate diagnostic block 24 as shown in the drawing, which can also form part of the central microcomputer. This diagnostic block 24: controls the area of idle controller 15 and tank-venting control, 19 via separate leads 24a, 24b at the start of a diagnosis; sets the appropriate air increments/decrements; and, registers either the resulting rotational speed or air flow deviations. Such deviations could be transmitted, as an appropriate signal, to the diagnostic unit 24 from microcomputer 11 via lead 25 shown as a dashed line.

Diagnostic unit 24 is thus provided, even as part of the microcomputer or of its programming, with appropriate means to quantitatively evaluate such deviations of rotational speed or air flow. Therefore, a display device 26 can also be controlled from diagnostic block 24 which emits a display to the outside according to the result of the diagnosis, for example, by means of display lights which light up green or red accordingly (green for basic operation; red for defect). Of course, this display can basically be in any form, even a letter display.

The invention includes software procedures with preference for diagnosing all the actuators. These procedures or programs are, if certain peripheral conditions are met, periodically started during normal operation (which is important) and remain undetectable for the operator of the vehicle while the system is operating satisfactorily. Thus, the hardware configuration remains unchanged. This also meets all official requirements (see, for example, California Air Resources Board—CARB) for being able to diagnose critical exhaust components exclusively with "on-board" means.

It is understood that the foregoing description is that of the preferred embodiments of the invention and that various changes and modifications may be made thereto without departing from the spirit and scope of the invention as defined in the appended claim.

What is claimed is:

1. A diagnostic method for quantitatively checking actuators in the open-loop and closed loop control of operating parameters of an internal combustion engine which includes: a fuel metering apparatus; an air-flow sensor; and, a central control unit including computer units; and, an exhaust system accommodating a lambda control, the actuators including the idle actuator and tank-venting valve (TEV) for effecting a tank ventilation, said actuators having respective hardware chains, the method comprising the steps of:

supplying increased or reduced air quantities ($\Delta Q_{TEV}$, $\Delta Q_{LLR}$) by means of a corresponding control of one of the tank-venting valve (TEV) and the idle actuator (LLS) during the operation of the engine; and, observing feedback of rotational speed changes which occur (rotational speed n=constant; $n_{Diagn}$>$n_{alt}$; and, $n_{Diagn}$<$n_{alt}$) to provide an indication as to the functioning capability of the hardware chains of said actuators wherein:

$n_{Diagn}$ is the diagnosed speed of the engine; and, $n_{alt}$ is the engine prior to starting the diagnosis.

2. The diagnostic method of claim I, wherein an increased air quantity ($\Delta Q_{TEV}$) is supplied by opening the tank-venting valve and simultaneously therewith, a correspondingly decreased air quantity ($-\Delta Q_{LLR}$) is supplied by closing the idle actuator with the particular air quantities ($\Delta Q$) being held equal, so that the total air flow remains constant and so that subsequently the rotational speed which remains substantially constant, the actuators with the respective hardware chains associated therewith are judged as operating correctly and, with an increase in rotational speed, the idle actuator is recognized as being defective and, with a reduction in rotational speed, the tank-venting valve is recognized as being defective.

3. Arrangement for performing a quantitative self-diagnosis of actuators in the open-loop and closed loop control of operating parameters of an internal combustion engine, the actuators including idle actuator (LLS) and tank-venting valve (TEV), the arrangement comprising:

supply means for supplying an increased air quantity or reduced air quantity [($\Delta Q_{TEV/LLR}$)]($\Delta Q_{TEV}$, $\Delta Q_{LLR}$) to the inlet region of the internal combustion engine by means of a corresponding control of said actuators;

comparison means for comparing the speed of the engine prior to the air flow change with a diagnosed rotational speed; and, indication means for indicating a defect in response to a speed change of one of the tank-venting valve ($n_{Diagn}$<$n_{alt}$−$\Delta n_{Tol}$) and the idle actuator ($n_{Diagn}$>$n_{alt}$+$\Delta n_{Tol}$) wherein:

$n_{Diagn}$ is the diagnosed speed of the engine;

$n_{alt}$ is the engine speed prior to starting the diagnosis; and, $\Delta n_{Tol}$ is the tolerance of rotational speed deviation (engine constant value, to be ascertained during application).

* * * * *

UNITED STATES PATENT AND TRADEMARK OFFICE
CERTIFICATE OF CORRECTION

PATENT NO. : 4,794,790

DATED : January 3, 1989

INVENTOR(S) : Florin Margarit-Metaxa and Helmut Denz

It is certified that error appears in the above-identified patent and that said Letters Patent is hereby corrected as shown below:

On the title page, line 5 of the "ABSTRACT", delete "value" and substitue -- valve as -- therefor.

On the title page, line 8 of the "ABSTRACT", delete "to" and substitue -- of -- therefor.

On the title page, line 9 of the "ABSTRACT", delete "preferbly" and substitue -- preferably -- therefor.

In column 1, line 10, insert a period after "engine".

In column 3, line 59, delete "command ti" and substitute -- command $t_i$ -- therefor.

UNITED STATES PATENT AND TRADEMARK OFFICE
CERTIFICATE OF CORRECTION

PATENT NO. : 4,794,790
DATED : January 3, 1989
INVENTOR(S) : Florin Margarit-Metaxa and Helmut Denz It is certified that error appears in the above-identified patent and that said Letters Patent is hereby corrected as shown below:

In column 4, line 46, insert -- (1) -- before "Tank".

In column 4, line 60, delete "$Q_{LLR} \rightarrow Q_{LLR} \Delta Q_{LLR\ Diagn.}$" and substitute -- $Q_{LLR} \rightarrow Q_{LLR} - \Delta Q_{LLR\ Diagn.}$ -- therefor.

In column 5, line 15, insert -- the -- between "is" and "tolerance".

In column 5, line 62, delete "(i-control)" and substitute -- ($\lambda$-control) -- therefor.

UNITED STATES PATENT AND TRADEMARK OFFICE
CERTIFICATE OF CORRECTION

PATENT NO. : 4,794,790

DATED : January 3, 1989

INVENTOR(S) : Florin Margarit-Metaxa and Helmut Denz

It is certified that error appears in the above-identified patent and that said Letters Patent is hereby corrected as shown below:

In column 6, beginning on line 20 and ending on line 23, delete the sentence "Stated otherwise,... hardward chains.", first occurrence only.

In column 6, line 53, delete the comma between "control" and "19".

In column 7, line 6, insert -- thus -- before "periodically".

In column 7, line 26, insert -- (LLS) -- between "actuator" and "and".

UNITED STATES PATENT AND TRADEMARK OFFICE
CERTIFICATE OF CORRECTION

PATENT NO. : 4,794,790
DATED : January 3, 1989
INVENTOR(S) : Florin Margarit-Metaxa and Helmut Denz It is certified that error appears in the above-identified patent and that said Letters Patent is hereby corrected as shown below:

In column 8, line 1, insert -- speed -- between "engine" and "prior".

In column 8, line 23, delete "$[(\Delta Q_{TEV/LLR})] (\Delta Q_{TEV}, \Delta Q_{LLR})$" and substitute -- $[(\pm \Delta Q_{TEV/LLR})] (\Delta Q_{TEV}, \Delta Q_{LLR})$ -- therefor.

In column 8, line 32, insert -- ( -- before the formula "$n_{Diagn} < n_{alt} - \Delta n_{Tol})$".

Signed and Sealed this

Tenth Day of April, 1990

Attest:

HARRY F. MANBECK, JR.

Attesting Officer     Commissioner of Patents and Trademarks